United States Patent [19]
Hausch et al.

[11] 3,880,810
[45] Apr. 29, 1975

[54] ADHESIVE COMPOSITIONS CONTAINING AROMATIC NITRO COMPOUNDS

[75] Inventors: Walter R. Hausch; John W. Fieldhouse; Edward L. Kay, all of Akron, Ohio

[73] Assignee: The Firestone Tire & Rubber Company, Arkon, Ohio

[22] Filed: July 30, 1973

[21] Appl. No.: 383,760

[52] U.S. Cl......... 260/77.5 R; 156/110 A; 156/331; 161/190; 252/182; 260/32.6 N; 260/33.6 UB; 260/75 TN; 260/77.5 MA; 260/77.5 CR
[51] Int. Cl.² .................. C08G 22/16; C08G 22/04
[58] Field of Search............ 156/110 A; 260/77.5 R, 260/77.5 SS, 75 NA, 77.5 A, 2.5 AC, 2.5 BB

[56] References Cited
UNITED STATES PATENTS

| | | | |
|---|---|---|---|
| 3,085,991 | 4/1963 | Finelli | 260/75 NA |
| 3,183,112 | 5/1965 | Gemassmer | 260/77.5 AT |
| 3,384,624 | 5/1968 | Heiss | 260/77.5 AP |

OTHER PUBLICATIONS

Chem. Abstracts, Vol. 71, No. 21, Nov. 24, 1969, p. 259, Abstract No. 100993k.

Products Report No. 12, "LD-167," E. I. du Pont de Nemours & Co., Inc., Wilmington, Del. (1958), 10 pages including title page and fly leaf.

*Primary Examiner*—H. S. Cockeram

[57] ABSTRACT

This invention relates to adhesive compositions containing an organic isocyanate, natural and synthetic elastomers and resins and as an adhesion promoter an aromatic nitro compound.

1 Claim, No Drawings

ADHESIVE COMPOSITIONS CONTAINING AROMATIC NITRO COMPOUNDS

FIELD OF THE INVENTION

This invention relates to obtaining improved adhesion between polyurethane rubbers and olefinic rubbers or other substrates including metals. By polyurethane rubbers are meant the rubbers produced by reaction of relatively high molecular weight polyester or polyether resins with polyisocyanates. By olefinic rubbers are meant those rubbers containing olefinic unsaturation in their polymer chains such as natural rubber, synthetic polyisoprene (IR), polybutadiene (BR), rubbery copolymers of butadiene and styrene (SBR), rubbery copolymers of butadiene and acrylonitrile (NBR), rubbery copolymers of isoprene and isobutylene (IIR), polychloroprene (CR), ethylene-propylene rubbers (EPDM) and the like. This invention has particular use in applications where strength of a high degree is important as in production of tires, belting, industrial rubber articles and like products composed of both polyurethane rubber and olefinic rubber components.

PRIOR ART

It is known from U.S. Pat. No. 2,905,582 that bonding of a polyurethane rubber to an olefinic rubber can be realized by interposing between such rubbers an adhesive including in combination an organic isocyanate and an aromatic compound containing at least one nitroso group attached directly to a ring carbon atom. The aromatic nitroso compounds contemplated by this patent are those wherein one or more of the molecular hydrogens of the aromatic nucleus is replaced by alkyl, alkoxy, cycloalkyl, aryl, arylalkyl, arylamine, arylnitrosoamine, halogen and like groups. This patent suggests that its adhesive compositions contain in addition to the described aromatic nitroso compounds and isocyanates also a so-called organic film-forming material such as natural or synthetic elastomer or resin and it is further contemplated by the patent that tires be produced by adhering a polyurethane rubber tread to an olefinic rubber body.

SUMMARY OF THE INVENTION

While this invention also relates to adhesive compositions comprising an organic isocyanate and often for best results an organic film-forming material, the adhesive compositions of this invention contain also a selected aromatic nitro compound as an adhesion promoter.

Simple aromatic nitro compounds such as nitrobenzene, nitrotoluene and nitroxylenes are not particularly good adhesion promoters. However, for some purposes, even these simple aromatic nitro compounds impart sufficient adhesion to satisfy a specific end-use which does not require an extraordinarily strong adhesive bond. For example, the simple aromatic nitro compounds would be adequate adhesion promoters for adhering decorative rubber articles to various substrates providing the articles are not exposed to high shear stress.

The preferred aromatic nitro compounds of this invention are compounds which contain an activated nitro function. These preferred aromatic nitro compounds are illustrated by the following generalized formula:

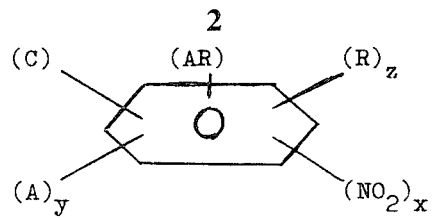

wherein ($NO_2$) represents a nitro function directly attached to the aromatic ring, (A) is a function attached to the aromatic ring which activates the nitro function such as hydroxyl, mercaptyl, carboxyl, alkoxy, alkylthio, amino, alkyl amino, halogen and sulfonic acid substituents, (R) is a hydrocarbyl substituent of 1 to 16 carbon atoms, (AR) in conjunction with the depicted ring contemplates condensed aromatic structures such as naphthalene, anthracene, phenanthracene and the like, (C) contemplates bis and tris compounds, $x$ is an integer of 1 to 5, $y$ is an integer of 1 to 5 and $z$ is an integer of 0 to 4.

Illustrative ortho and para nitrophenyl hydrocarbyl ethers useful as adhesion promoters of the invention include those wherein the hydrocarbyl substituent is a saturated straight chain alkyl group such as methyl, ethyl, propyl and higher alkyl groups, an unsaturated straight chain group such as a vinyl, allyl, propenyl and similar groups, a branched chain saturated or unsaturated group such as isopropyl, secbutyl, tert-butyl, isopropenyl and like groups, a cyclic group such as cyclohexyl, cycloheptyl and the like, or an aromatic group such as a phenyl, tolyl, xylyl or naphthyl group.

Other illustrative adhesion promoters of the invention include simple aromatic compounds such as nitrobenzene, o-nitrotoluene, m-nitrotoluene, p-nitrotoluene, 2,3-dimethylnitrobenzene, 2,4-dimethylnitrobenzene, 2,5-dimethylnitrobenzene, 2,6-dimethylnitrobenzene, 3,4-dimethylnitrobenzene, 3,5-dimethylnitrobenzene, 2-methyl-3-ethylnitrobenzene, 2-ethyl-3-methylnitrobenzene and the like.

A preferred group of adhesion promoters of the invention are nitrophenols such as o-nitrophenol, p-nitrophenol, 2-nitro-3-methylphenol, 2-nitro-4-methylphenol, 2-nitro-5-methylphenol, 2-nitro-6-methylphenol, 2-methyl-4-nitrophenol, 3-methyl-4-nitrophenol, 2,3-dimethyl-4-nitrophenol, 2-nitro-3,4-dimethylphenol, 2,4-dinitrophenol, 2,6-dinitrophenol, 2,4-dinitro-3-methylphenol, 2,6-dinitro-4-methylphenol, and nitrothiophenols such as o-nitrothiophenol, p-nitrothiophenol, 2-nitro-3-methylthiophenol, 2-nitro-4-methylthiophenol, 2-nitro-5-methylthiophenol, 2-nitro-6-methylthiophenol, 2-methyl-4-nitrothiophenol, 3-methyl-4-nitrothiophenol, 2,3-dimethyl-4-nitrothiophenol, and 2-nitro-3,4-dimethylthiophenol.

Illustrative alkoxy and alkylthio aromatic compounds suitable as adhesion promoters of the invention are o-nitroanisole, p-nitroanisole, 2-nitro-3-methylanisole, 2-nitro-4-methylanisole, 2-nitro-5-methylanisole, 2-nitro-6-methylanisole, 2-methyl-4-nitroanisole, 3-methyl-4-nitroanisole, 2,3-dimethyl-4-nitroanisole, 2-nitro-3,4-dimethylanisole, o-nitrothioanisole, p-nitrothioanisole, 2-nitro-3-methylthioanisole, 2-nitro-4-methylthioanisole, 2-nitro-5-methylthioanisole, 2-nitro-6-methylthioanisole, 2-methyl-4-nitrothioanisole, 3-methyl-4-nitrothioanisole, 2,3- dimethyl-4-nitrothioanisole, 2-nitro-3,4-dimethylthioanisole and the like.

Amine-activated aromatic nitro compounds useful as adhesion promoters of the invention include o-nitroaniline, p-nitroaniline, 2-nitro-3-methylaniline, 2-nitro-4-methylaniline, 2-nitro-5-methylaniline, 2-nitro-6-methylaniline, 2-methyl-4-nitroaniline, 3-methyl-4-nitroaniline, 2,3-dimethyl-4-nitroaniline, 2-nitro-3,4-dimethylaniline, o-nitroN-methylaniline, p-nitro-N-methylaniline, 2-nitro-3-methyl-N-methylaniline, 2-nitro-4-methyl-N-methylaniline, 2-nitro-5-methyl-N-methylaniline, 2-nitro-6-methyl-N-methylaniline, 2-methyl-4-nitro-N-methylaniline, 3-methyl-4-nitro-N-methylaniline, 2,3-dimethyl-4-nitro-N-methylaniline, and 2-nitro-3,4-dimethyl-N-methylaniline.

Illustrative halogen derivatives of aromatic nitro compounds useful as adhesion promoters are o-chloronitrobenzene, o-bromonitrobenzene, p-chloronitrobenzene, p-bromonitrobenzene, 2-chloro-3-methylnitrobenzene, 2-bromo-3-methylnitrobenzene, 2-chloro-4-methylnitrobenzene, 2-bromo-4-methylnitrobenzene, 2-chloro-5-methylnitrobenzene, 2-bromo-5-methylnitrobenzene, 2-chloro-6-methylnitrobenzene, 2-bromo-6-methylnitrobenzene, 2-chloro-3,4-dimethylnitrobenzene, 2-bromo-3,4-dimethylnitrobenzene, 2-chloro-4,5-dimethylnitrobenzene, 2-bromo-4,5-dimethylnitrobenzene, 2,3-dimethyl-4-chloronitrobenzene, 2,3-dimethyl-4-bromonitrobenzene, 2,6-dimethyl-4-chloronitrobenzene, 2,6-dimethyl-4-bromonitrobenzene, 3,5-dimethyl-4-chloronitrobenzene, 3,5-dimethyl-4-bromonitrobenzene, 2-chloro-4-nitrobenzoic acid, 3-chloro-4-nitrobenzoic acid, 2-bromo-4-nitrobenzoic acid, and 3-bromo-4-nitrobenzoic acid.

Illustrative of other hydrocarbyl activated aromatic nitro compound adhesion promoters are 2-nitro-4-tert.-butylphenol, 2-nitro-4-hexylphenol, 2-nitro-4-octylphenol, 2-nitro-4-nonylphenol, 2-nitro-4-dodecylphenol; and of condensed aromatic structures are 2-nitronaphthol, 4-nitronaphthol, 2-nitro-3-methylnaphthol, 2-nitro-4-methylnaphthol, 2-nitro-3-chloronaphthol, 2-nitro-4-chloronaphthol, 2-nitro-3-bromonaphthol, 2-nitro-4-bromonaphthol, 1-nitro-beta-naphthol, 1-nitro-beta-naphthylamine, 1-nitro-2-chloronaphthelene, 1-nitro-2-bromonaphthalene, 3-nitro-4-hydroxybiphenyl, 3-nitro-4-aminobiphenyl, 3-nitro-4-chlorobiphenyl, 3-nitro-4-bromobiphenyl, 3,3'-dinitro-4,4'-dihydroxybiphenyl, 3,3'-dinitro-4,4'-diaminobiphenyl, 3,3'-dinitro-4,4'-dichlorobiphenyl, and 3,3'-dinitro-4,4'-dibromobiphenyl.

Illustrative bis and tris adhesion promoters of the invention are methylenebis (2-nitro-4-hydroxybenzene), methylenetris (2-nitro-4-hydroxybenzene), methylenebis (2-nitro-4-aminobenzene), methylenetris (2-nitro-4-aminobenzene), methylenebis (2-nitro-4-chlorobenzene), methylenetris (2-nitro-4-chlorobenzene), methylenebis (2-nitro-4-bromobenzene), methylenetris (2-nitro-4-bromobenzene) and methylenetris (2-nitro-4-bromobenzene).

ADHESION TESTS

The adhesion test results reported hereafter were obtained on laminates of olefinic rubber and polyurethane rubber, a cement in accordance with the invention having been interposed between the two rubbers. The procedure unless otherwise stated was as follows:

First, a sheet 6 inches square and 0.100 inch thick was prepared from vulcanizable olefinic rubber compound. One side of the olefinic rubber sheet was backed with reinforcing nylon tire fabric treated for adhesion. This sheet was cured (usually of the order of 20 to 30 minutes at about 300°F.). The cured olefinic rubber sheet was buffed to a satiny finish on the side opposite the tire fabric, the buffed surface being washed with acetone or white gasoline. A two inch by six inch portion of the buffed surface in a direction perpendicular to the direction of the tire cord of the fabric was covered with holland cloth, the holland cloth being securely taped down on all four edges. The exposed buffed surface of the cured olefinic rubber sheet was then coated with the adhesive cement of the invention being tested and allowed to dry. The olefinic rubber sheet was then placed in the bottom of a 6 by 6 inches by 0.250 inch mold with the adhesive cement coated surface up. A curable liquid polyurethane rubber compound was poured into the mold in a sufficient quantity to fill the mold. After the polyurethane material had gelled a 6 by 6 inches piece of square woven nylon was placed on the surface of the polyurethane. A cover plate was placed on the top of the mold and the mold was heated 3 hours at 212°F. to complete the curing of the polyurethane rubber. Flashing was trimmed from the resulting test laminate and the edge containing the holland cloth was cut back to expose the cloth. One inch wide test strips were cut from the laminate in a direction parallel to the direction of the reinforcing tire cord. After 24 hours room temperature test results were obtained by clamping the free ends of a given test strip to the jaws of a testing machine and the jaws of the test machine were pulled apart at a rate of 2 inches per minute, the force in pounds per inch at tear as well as the nature of the tear being observed. With regard to the nature of the tear, the terms "Pad Tear", "Rubber Tear", "Urethane Tear", following meanings. Pad Tear means that the tear was along the fabric. Rubber Tear means that the tear was in the olefinic rubber. Urethane Tear means that the tear was in the polyurethane rubber. Adhesive Failure means that the tear was along the interface between the polyurethane rubber and the olefinic rubber. Where the percentage of tear reported hereafter is less than 100%, the balance was tear along the interface. For elevated temperature testing the test samples were placed in an oven maintained at the desired elevated temperature at 5 minute intervals. Each test sample was then removed after being in the oven a total of 15 minutes and immediately subjected to the pulling test.

The following examples illustrate practice of the invention. In the examples, the vulcanizable olefinic rubber sheets employed were prepared of the following formulation:

|  | Parts by Weight |
|---|---|
| SBR | 60.0 |
| Polybutadiene | 40.0 |
| Carbon black | 70.0 |
| Oil | 44.0 |
| Zinc Oxide | 2.0 |
| Stearic Acid | 2.0 |
| Wax | 3.0 |
| Sulfur | 1.7 |
| Accelerator | 1.2 |
| Antioxidant | 1.0 |

Following the procedure above outlined, such sheets were backed, cured, buffed and one surface coated by brushing with a cement in accordance with the invention. The adhesive coated sheets were in each instance formed into a laminate by the abovedescribed procedure with a polyurethane rubber composition of the following formulation:

|  | Parts by Weight |
| --- | --- |
| Adiprene L-167* | 100.00 |
| Silicone DC-200** | 0.10 |
| Methylenebis(o-chloro-p-aniline) | 20.98 |
| Dioctyl phthalate | 20.00 |

*A liquid polyurethane rubber supplied by E. I. duPont de Nemours & Co., Inc., said polyurethane rubber containing 6.15 to 6.55 percent available isocyanate and being curable to a solid rubber with polyamine or polyol compounds.
**A silicone oil supplied by Dow Corning Corporation.

EXAMPLE I

A cement containing an adhesion promoter of the invention was prepared of the following formulation:

|  | Grams |
| --- | --- |
| 2, 4-dinitrophenol | 0.75 |
| Adiprene L-167 | 3.00 |
| Toluene diisocyanate | 1.50 |
| Toluene | 3.00 |

Following the above outlined procedure, adhesion test strips were produced employing this cement to adhere the described olefinic rubber to the described polyurethane rubber. The test results obtained were as follows:

| Test Temperature | Adhesion, lbs./in. | Nature of Adhesion |
| --- | --- | --- |
| Room | 110 | 100% rubber tear |
| 212°F. | 52 | 95% rubber tear |
| 250°F. | 38 | 10% rubber tear |

EXAMPLE II

A cement containing an adhesion promoter of the invention was prepared of the following formulation:

|  | Grams |
| --- | --- |
| 2-chloro-4-nitrobenzoic acid | 0.75 |
| Adiprene L-167 | 1.50 |
| Toluene diisocyanate | 3.00 |
| Toluene | 3.00 |

Following the above outlined procedure, adhesion test strips were produced employing this cement to adhere the described olefinic rubber to the described polyurethane rubber. The test results obtained were as follows:

| Test Temperature | Adhesion, lbs./in. | Nature of Adhesion |
| --- | --- | --- |
| Room | 78 | 100% rubber tear |
| 212°F. | 43 | 90% pad tear |
| 250°F. | 35 | 100% pad tear |

EXAMPLE III

A cement containing an adhesion promoter of the invention was prepared of the following formulation:

|  | Grams |
| --- | --- |
| o-nitrophenol | 0.75 |
| Adiprene L-167 | 1.50 |
| Toluene diisocyanate | 3.00 |
| Toluene | 3.00 |

Following the above outlined procedure, except that the test pads were post cured 90 minutes at 250°F., adhesion test strips were produced employing this cement to adhere the described olefinic rubber to the described polyurethane rubber. The test results obtained were as follows:

| Test Temperature | Adhesion, lbs./in. | Nature of Adhesion |
| --- | --- | --- |
| Room | 55.0 | 50% rubber and pad tear |
| 212°F. | 13.5 | 100% pad tear |
| 250°F. | 18.5 | 100% pad tear |
| 300°F. | 8.5 | 100% pad tear |

EXAMPLE IV

A cement containing an adhesion promoter of the invention was prepared of the following formulation:

|  | Grams |
| --- | --- |
| p-nitrophenol | 0.75 |
| Adiprene L-167 | 1.50 |
| Toluene diisocyanate | 3.00 |
| Toluene | 3.00 |

Following the above outlined procedure, except that the test pads were post cured 90 minutes at 250°F., adhesion test strips were produced employing this cement to adhere the described olefinic rubber to the described polyurethane rubber. The test results obtained were as follows:

| Test Temperature | Adhesion, lbs./in. | Nature of Adhesion |
| --- | --- | --- |
| Room | 75 | 25% rubber tear |
| 212°F. | 18 | 100% pad tear |
| 250°F. | 23 | 100% pad tear |
| 300°F. | 9 | 100% pad tear |

EXAMPLE V

A cement containing an adhesion promoter of the invention was prepared of the following formulation:

|  | Grams |
| --- | --- |
| o-nitroanisole | 0.75 |
| Adiprene L-167 | 1.50 |
| Toluene diisocyanate | 3.00 |
| Toluene | 3.00 |

Following the above outlined procedure, adhesion test strips were produced employing this cement to adhere the described olefinic rubber to the described polyurethane rubber. The test results obtained were as follows:

| Test Temperature | Adhesion, lbs./in. | Nature of Adhesion |
| --- | --- | --- |
| Room | 180.0 | 100% urethane tear |

-Continued

| Test Temperature | Adhesion, lbs./in. | Nature of Adhesion |
| --- | --- | --- |
| 212°F. | 17.0 | 75% pad tear |
| 250°F. | 18.5 | 75% pad tear |
| 300°F. | 7.0 | 75% pad tear |

EXAMPLE VI

A cement containing an adhesion promoter of the invention was prepared of the following formulation:

| | Grams |
| --- | --- |
| P-nitroanisole | 0.75 |
| Adiprene L-167 | 1.50 |
| Toluene diisocyanate | 3.00 |
| Toluene | 3.00 |

Following the above outlined procedure, adhesion test strips were produced employing this cement to adhere the described olefinic rubber to the described polyurethane rubber. The test results obtained were as follows:

| Test Temperature | Adhesion, lbs./in. | Nature of Adhesion |
| --- | --- | --- |
| Room | 75 | 100% pad tear |
| 212°F. | 32 | 100% pad tear |
| 250°F. | 15 | 75% pad tear |
| 300°F. | 8 | 80% pad tear |

EXAMPLE VII

A cement containing an adhesion promoter of the invention was prepared of the following formulation:

| | Grams |
| --- | --- |
| o-nitrophenol | 0.75 |
| Adiprene LD-784* | 1.5 |
| Toluene diisocyanate | 3.0 |
| Toluene | 2.0 |

*A polyurethane supplied by E. I. duPont de Nemours & Co., Inc.

Adhesion test strips were produced employing this cement to adhere the described olefinic rubber to a polyurethane rubber stock of the following formulation:

| | Grams |
| --- | --- |
| Adiprene LD-784 | 100.0 |
| Silicone DC-200 | 0.1 |
| Caytur 21* | 33.98 |
| Dioctyl phthalate | 3.1 |

*A mixture of methylene dianiline — sodium chloride complex and dioctyl phthalate supplied by E. I. duPont de Nemours & Co., Inc.

These test pads were cured for 2 hours at 285°F. The test results obtained were as follows:

| Test Temperature | Adhesion lbs./in. | Nature of Adhesion |
| --- | --- | --- |
| Room | 57.5 | 100% rubber tear |
| 212°F. | 24.5 | 5% rubber tear |
| 250°F. | 37.0 | 15% rubber tear |
| 300°F. | 9.0 | 100% adhesion failure |

As shown by the results reported in the above examples, excellent adhesion is obtained by the use of cements containing the adhesion promoters of the invention. Such cements without the adhesion promoters of the invention are not effective adhesives.

A polyurethane rubber as stated previously may be based on a polyester or polyether or combination of polyester and polyether. These rubbers or their prepolymers are suitable film formers. Other suitable film formers useful in the practice of the invention are the natural and synthetic elastomers generally including without limitation the olefinic rubbers aforementioned as well as telechelic polymers and olefinic resins and their halogen containing analogs, condensation polymers such as phenol-aldehyde and epoxy resins, polyamides, polyesters and the like. Further suitable film formers include halogenated waxes.

Although toluene diisocyanate was used to illustrate our invention, other suitable isocyanates include phenylisocyanate, tolylisocyanate, xylene diisocyanate, cumene diisocyanate, methylenebis(p,p'-phenylisocyanate), methylenebis(p,p'-tolylisocyanate), methylenebis(p,p'-xylylisocyanate) and the like. Triisocyanates or higher will also function but are generally more expensive and less readily available on a commercial scale. Toluene diisocyanate is preferred on the basis of commercial availability. So-called blocked isocyanates which release the isocyanate at specified temperatures will also function provided that the release temperature in lower than the cure temperature of the composite. Representative blocked isocyanates are phenol blocked or caprolactam blocked isocyanates. Dimeric isocyanates are also applicable. Organic isothiocyanates such as phenylisothiocyanate are also applicable. Another criterion for selection of an isocyanate is whether it would have a tendency to discolor the substrate. For example, Hylene W* is essentially non-staining and would be preferred on this basis.

*Methylenebis(4,4'-cyclohexylisocyanate) supplied by E. I. duPont de Nemours & Co., Inc.

Although toluene is used above as a solvent as a matter of convenience, benzene, xylenes, tetrahydrofuran, dimethylylformamide or many other common organic solvents as well as toluene are suitable. Any aprotic solvent should be effective. In the case the adhesion promoter is liquid, the solvent may be deleted.

The exact concentrations of the film former, adhesion promoter and isocyanate will depend on the strength of the adhesive bond desired in the final product. Generally, concentrations are selected to obtain optimum adhesion desired for a specific application. In addition, the concentrations are also adjusted to obtain a correct viscosity; that is, if the formulation is to be sprayed, the viscosity should be low, if brushed or dipped an intermediate viscosity would be desired. If the adhesive is to be troweled onto the surface, a higher viscosity is desired. As a guide, suitable concentrations of film former, adhesion promoter and isocyanate on a solvent-free basis normally fall within the following ranges:

| | Parts by Weight |
| --- | --- |
| Film Former | 1 -90 |
| Adhesion Promoter | 1.00–60 |
| Isocyanate | 1.00–95 |

The data supplied in the Examples demonstrate the utility of the adhesion promoters of the invention for adhering of rubber to polyurethane. The data are indicative that the adhesive formulations give good results with rubber to rubber and urethane to urethane. A particularly desirable application of the adhesives of the invention involves the adhesion of olefinic rubber tire treads to polyurethane rubber tire bodies and conversely in adhering polyurethane rubber tire treads to olefinic rubber tire bodies. Since good adhesion results are obtained using a polyurethane film former based on either a polyether or polyester, good adhesion of either an olefinic rubber or a polyurethane rubber to polyesters also is obtained by the adhesives of the invention.

A further application of the invention involves treatment of rubber articles with the adhesive formulations of the invention as a means of priming the surface for painting with a urethane based paint or with an acrylate based paint.

Generally, we believe that the adhesive formulations as herein disclosed would be effective for adhering olefinic rubber to thermoplastic or thermosetting resins such as polystyrene, polyalphamethylstyrene, polyvinylchloride, polyvinylidenechloride, polyacrylates, polymethacrylates, polyacrylonitrile, polyesters, polyamides, etc. The adhesive formulations should also be effective for adhering these thermoplastic or thermosetting resins to themselves or to any member of the above-mentioned groups. The adhesive formulations as herein disclosed would also be effective for adhering olefinic rubbers or polyurethane rubbers to themselves or to metals, glass, ceramics, soft and hard woods as well as adhering together any combination of the preceding substrates.

We claim:

1. An adhesive composition comprising an organic isocyanate and natural and synthetic elastomers and resins and as an adhesion promoter a compound selected from the group consisting of o-nitrophenol, p-nitrophenol, o-nitroanisole, p-nitroanisole, 2,4-dinitrophenol, and 2-chloro-4-nitrobenzoic acid.

* * * * *

PO-1050
(5/69)

UNITED STATES PATENT OFFICE
CERTIFICATE OF CORRECTION

Patent No. 3,880,810          Dated _____

Inventor(s) WALTER R. HAUSCH ET AL

It is certified that error appears in the above-identified patent and that said Letters Patent are hereby corrected as shown below:

Column 4, line 39, after " "Urethane Tear", " insert --and "Adhesive Failure" as they may appear hereafter have the--;

Column 8, line 28, "in" should read --is--.

Signed and Sealed this twenty-sixth Day of August 1975

[SEAL]

Attest:

RUTH C. MASON
Attesting Officer

C. MARSHALL DANN
Commissioner of Patents and Trademarks